US012660939B2

(12) United States Patent
Chen et al.

(10) Patent No.: US 12,660,939 B2
(45) Date of Patent: Jun. 23, 2026

(54) AIR MATTRESS SYSTEM WITH CPR VALVE DEVICE

(71) Applicant: Wellell Inc., New Taipei City (TW)

(72) Inventors: Bo-Tai Chen, New Taipei City (TW); Sheng-Wei Lin, New Taipei City (TW); Chung-Yi Lin, New Taipei City (TW); Yen-Chieh Chen, New Taipei City (TW); Chih-Kuang Chang, New Taipei City (TW); Yu-Chen Liu, New Taipei City (TW); Pi-Kai Lee, New Taipei City (TW)

(73) Assignee: WELLELL INC., New Taipei City (TW)

( * ) Notice: Subject to any disclaimer, the term of this patent is extended or adjusted under 35 U.S.C. 154(b) by 0 days.

(21) Appl. No.: 18/882,790

(22) Filed: Sep. 12, 2024

(65) Prior Publication Data

US 2026/0069048 A1 Mar. 12, 2026

(30) Foreign Application Priority Data

Oct. 2, 2023 (TW) ................................ 112137786

(51) Int. Cl.
*A47C 27/08* (2006.01)
*A61G 7/057* (2006.01)

(52) U.S. Cl.
CPC ........ *A47C 27/083* (2013.01); *A61G 7/05769* (2013.01)

(58) Field of Classification Search
CPC .. A61G 7/05769; A47C 27/08; A47C 27/081; A47C 27/082; A47C 27/083
See application file for complete search history.

(56) References Cited

U.S. PATENT DOCUMENTS 5,243,723 A * 9/1993 Cotner ................. A61H 9/0078 5/710
5,373,595 A * 12/1994 Johnson ............. A61G 7/05776 285/361
5,647,079 A * 7/1997 Hakamiun ......... A61G 7/05776 5/713
2022/0265058 A1 * 8/2022 Chang .................. A47C 27/082
2025/0332048 A1 * 10/2025 Lin ...................... A61G 7/0525

FOREIGN PATENT DOCUMENTS

CN 119745621 A * 4/2025 ......... A61G 7/05769
EP 4534059 A1 * 4/2025 ......... A61G 7/05769
WO WO-2024145325 A1 * 7/2024 ............. A61G 7/015
WO WO-2025038331 A2 * 2/2025 ............. G09G 5/006

* cited by examiner

*Primary Examiner* — David E Sosnowski
(74) *Attorney, Agent, or Firm* — WPAT, PC

(57) ABSTRACT

The present invention discloses an air mattress system including an inflatable air mattress, an air pipeline and a CPR valve device. The CPR valve device is configured to have a top that is not lower than a support surface near the CPR valve device in a state of use when a patient lies on the inflatable air mattress. The above provides deflation of the air mattress with desirable and significant operating guidance, such that the CPR valve device can be quickly located and operated, and the time need for a precedent procedure of the deflation of the inflatable air mattress can be effectively reduced. Thus, a patient can more promptly receive first aid to increase the CPR success rate, and this is conducive to improving quality and effects of emergency medical treatment.

6 Claims, 10 Drawing Sheets

AIR MATTRESS SYSTEM WITH CPR VALVE DEVICE

BACKGROUND OF THE INVENTION

Field of the Invention

The present invention relates to an air mattress system, and more particularly to an air mattress system having a CPR valve device.

Description of the Prior Art

In the field of medical treatment and/or caretaking, in addition to providing support with comfort to a patient, an air mattress system with inflation and deflation control over air cells also enables the body of a patient to turn, hence reducing chances of bedsores.

An air mattress system, by using air cells, can provide a patient with comfortable lying experience and prevention of related diseases and injuries. Moreover, in a normal state of use in which air is present in air cells, an air mattress system does not provide a patient with an inelastic bottom support. Thus, when an air mattress system needs to be quickly deflated so as to reduce the level of elasticity and meet an emergency environment in response to the need of first aid for a patient, the air mattress system is put to the test.

In general, an emergency deflation assembly of an air mattress can also be referred to as a cardiopulmonary resuscitation (CPR) deflation device, and a position for disposing such conventional CPR deflation device may be located on a host or a pipeline connecting a host and a body of the air mattress. When emergency CPR steps need to be performed on a patient, medical staff needs to quickly deflate air cells of the air mattress located near the chest area of the patient. Due to the arrangement of linked air pipelines, the deflation portion of a conventional CPR device disposed on a host or connected to the host and the body of the air mattress is located further away from the chest of the patient. As a result, the speed of deflation of air cells corresponding to the chest area of the patient is reduced, and this directly affects the prime time for performing CPR first aid on the patient.

In other prior art, there are CPR deflation devices attached to a side of an air mattress by means of a turning knob. Although such configuration of being attached to a side of a mattress provides a position closer to the chest area of a patient, this configuration means can be easily blocked by side rails of a bed frame and hence have impaired visibility and operability, and the side rails can even become damaged by collisions if a distance thereof is not controlled properly, causing more unnecessary precedent steps in the actual practice of CPR first aid measures. Therefore, there is a need for an air mattress system having a CPR deflation device capable of quick deflation with respect to a chest area and providing sufficient visibility and maximized convenience of operation.

SUMMARY OF THE INVENTION

It is an object of the present invention to enable an air mattress system to provide good visibility and significant convenience of operation for a deflation process of air cells when a patient needs emergency care.

It is another object of the present invention to reduce the time needed for a precedent procedure of deflation of air cells.

To achieve the above and other objects, the present invention provides an air mattress system including an inflatable air mattress, an air pipeline and a CPR valve device. The inflatable air mattress includes a support surface for a patient to lie on and is connected to an inflation source. The air pipeline is in fluid communication with the inflatable air mattress and the inflation source. The CPR valve device is in fluid communication with the air pipeline, and is operable to provide a path for releasing air from the inflatable air mattress. The CPR valve device is configured to have a top that is not lower than the support surface near the CPR valve device in a state of use when the patient lies on the inflatable air mattress.

According to some embodiments, the CPR valve device can be disposed on a top side of the inflatable air mattress, wherein the top side is near the head of the lying patient.

According to some embodiments, the CPR valve device can include an air release port, and an air exit direction of the air release port is substantially perpendicular to the support surface of the inflatable air mattress.

According to some embodiments, the air mattress system can include an adapter. The adapter is connected between the air pipeline and the CPR valve device, and is operable to change a direction of air flowing in the air pipeline from a direction parallel to the support surface to a direction perpendicular to the support surface.

According to some embodiments, the adapter can include a first air channel and a second air channel in fluid communication with each other. A direction of air flowing in the first air channel is substantially perpendicular to a direction of air flowing in the second air channel, an air inlet end of the first air channel is connected to the air pipeline, a junction of the second air channel from the first air channel extends along a direction substantially perpendicular to the support surface of the inflatable air mattress and is away from the support surface, and an air outlet end of the second air channel is connected to the CPR valve device.

According to some embodiments, the air mattress system can include a support member. The support member supports and limits the CPR valve device on one side of the inflatable air mattress.

To achieve the above and other objects, the present invention further provides an air mattress system including an inflatable air mattress, an air pipeline and a CPR valve device. The air pipeline is connected to the inflatable air mattress and is in fluid communication with the inflatable air mattress. The CPR valve device is in fluid communication with the air pipeline, and is operable to provide a path for releasing air from the inflatable air mattress. In an inflated state of the inflatable air mattress, a position of a junction between the CPR valve device and the air pipeline is lower than a position at a half of a height of the inflatable air mattress, and a height of the CPR valve device is greater than a half of the height of the inflatable air mattress.

According to some embodiments, the inflatable air mattress is for a patient to lie on, and the CPR valve device is disposed at a position on a top side of the inflatable air mattress near the head of the lying patient.

According to some embodiments, the CPR valve device can include an air release port, and an air exit direction of the air release port faces upward.

According to some embodiments, the air mattress system can include an adapter. The adapter is connected between the air pipeline and the CPR valve device, and is operable to change a direction of air flowing in the air pipeline from a horizontal direction to a vertical direction.

Accordingly, the CPR valve device is disposed at a position which allows its top to be leveled with or higher than the support surface nearby, such that the CPR valve device can be quickly located and operated, and the time need for a precedent procedure of the deflation of the inflatable air mattress can be effectively reduced. Thus, a patient can more promptly receive first aid to increase the CPR success rate, and this is conducive to improving quality and effects of emergency medical treatment.

DETAILED DESCRIPTION OF THE EMBODIMENTS

Objectives, features, and advantages of the present disclosure are hereunder illustrated with specific embodiments, depicted with drawings, and described below.

In the disclosure, descriptive terms such as "include, comprise, have" or other similar terms are not for merely limiting the essential elements listed in the disclosure, but can include other elements that are not explicitly listed and are however usually inherent in the components, structures, devices, portions, sections or regions.

In the disclosure, the terms similar to ordinals such as "first" or "second" described are for distinguishing or referring to associated identical or similar components or structures, and do not necessarily imply the orders of these components, structures, devices, portions, sections or regions in a spatial aspect. It should be understood that, in some situations or configurations, the ordinal terms could be interchangeably used without affecting the implementation of the present invention.

In the disclosure, descriptive terms such as "a" or "one" are used to describe the components, structures, devices, portions, sections or regions, and are for illustration purposes and providing generic meaning to the scope of the present invention. Therefore, unless otherwise explicitly specified, such description should be understood as including one or at least one, and a singular number also includes a plural number.

An air mattress system applied for medical and/or caretaking purposes provides functions of adjusting levels of firmness and support of an air mattress as well as assisting a patient in body turning by means of inflation and deflation control, so as to meet support requirements of the patient in resting, nursing and special conditions.

In the field of medical and/or caretaking applications, it is possible that a patient may need cardiopulmonary resuscitation (CPR) measures. The CPR is a measure to restore breathing and blood circulation of the patient through chest compression and massage to ensure that the brain stays functional. While CPR is performed, the patient needs to lie on the back on a solid planar surface in order to enable the patient to bear a proper pressing force during such process. Accordingly, an air mattress applied in the field of medical and/or caretaking circumstances needs a function of quickly releasing air therein in an emergency, so as to form environmental conditions suitable for the implementation of CPR.

Figure 1:
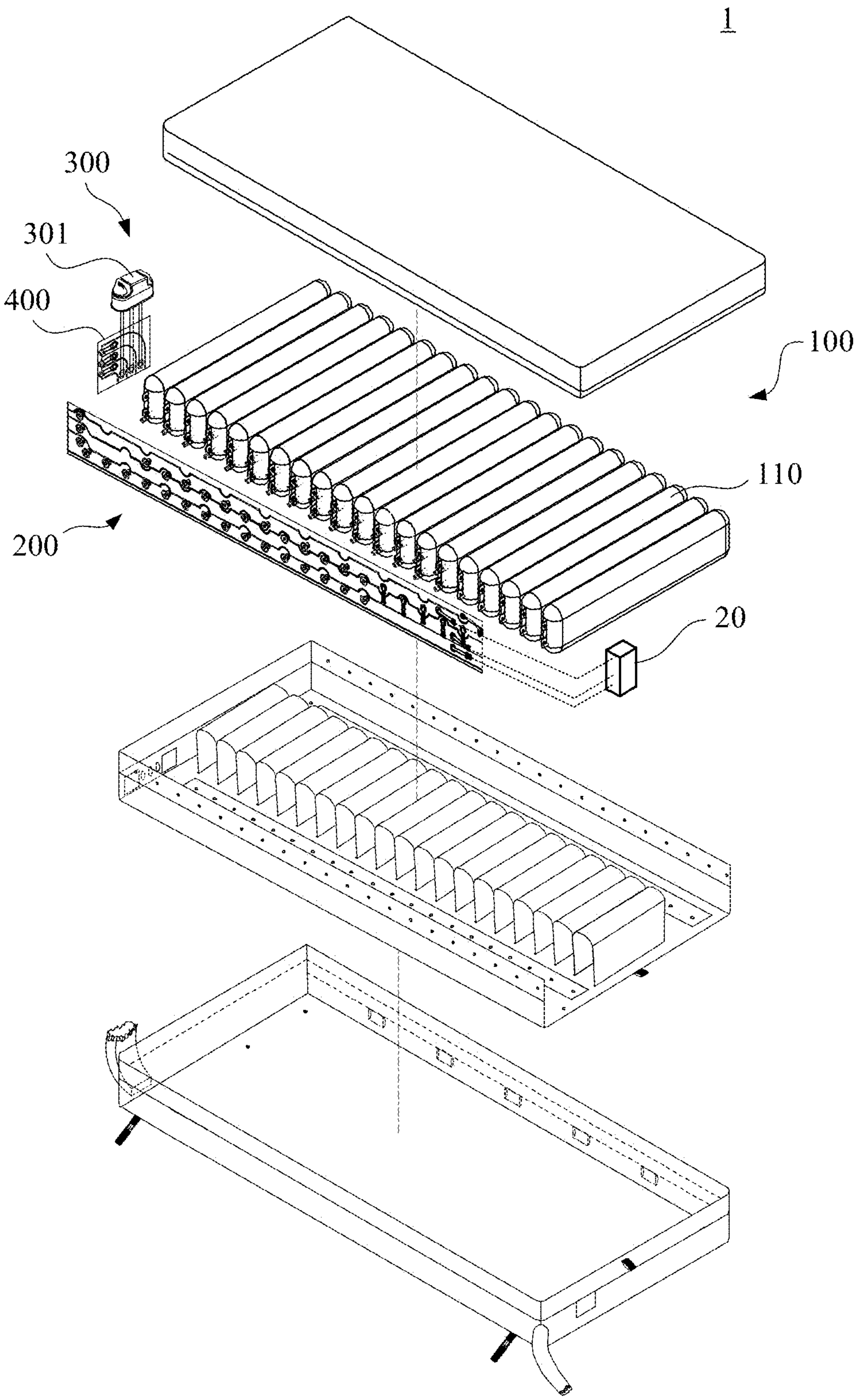
FIG. 1 is an exploded schematic diagram of an air mattress system according to some embodiments of the present invention.
Figure 2:
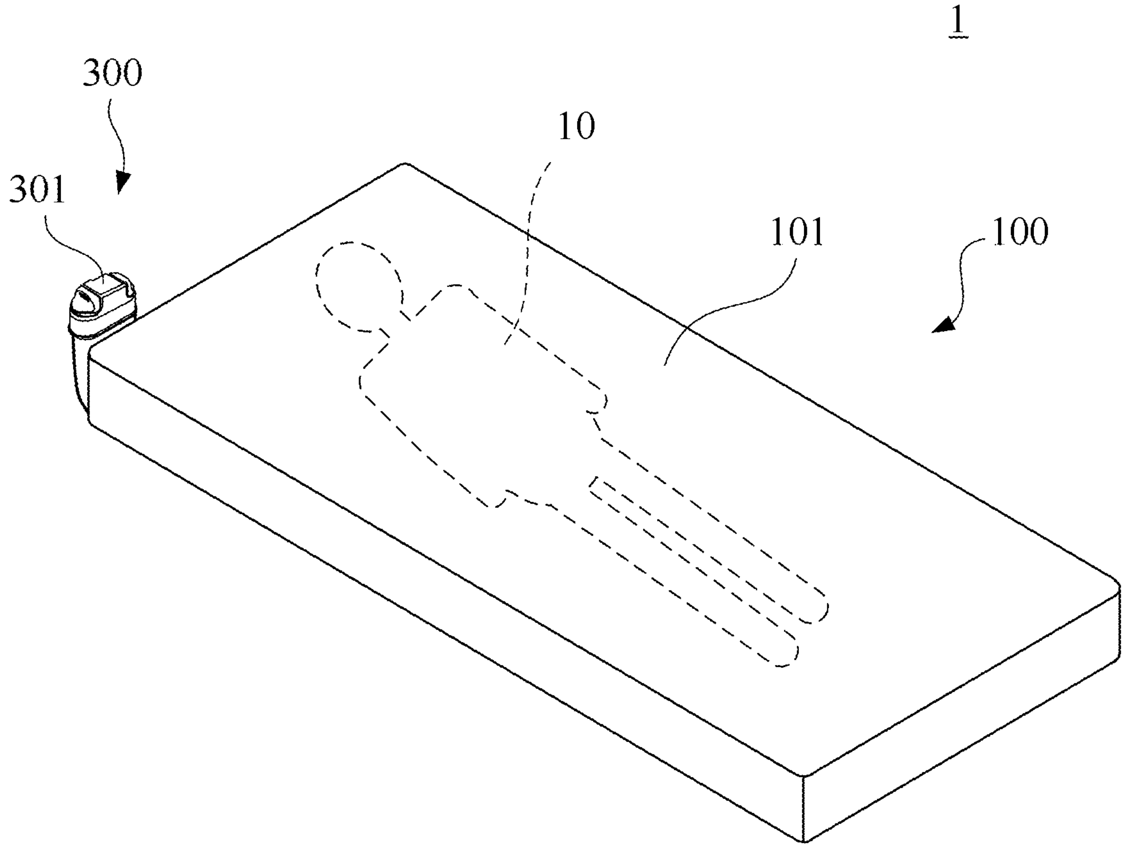
FIG. 2 is a schematic diagram of an air mattress system according to some embodiments of the present invention.

Referring to FIG. 1 and FIG. 2, FIG. 1 shows an exploded schematic diagram of an air mattress system according to some embodiments, and FIG. 2 shows a schematic diagram of an air mattress system according to some embodiments.

An air mattress system 1 includes an inflatable air mattress 100, an air pipeline 200 and a CPR valve device 300. Moreover, the air mattress system 1 can further include devices and parts such as a control host, a bedspread, a bottom sheet, and fixing or supporting straps. In the field of medical and caretaking applications, the air mattress system 1 is usually used together with a bed frame (not shown). The bed frame is at least arranged with movable side rails on long sides on both sides so as to form block walls on the outmost sides, further providing assistance for the object of preventing a patient from falling off the bed, and the side rails can be removed, lowered or put down when not needed. Moreover, a bed frame usually has a function of lifting or inclining the shoulders/back/legs, so as to assist a patient to achieve or maintain a specific posture. Before CPR is performed, in order to put a patient into a posture of lying on the back, the bed frame is adjusted to a flat state (that is, a form in which a carrier surface of the bed frame is completely flat), so that the inflatable air mattress 100 thereon is also a flat state.

In the air mattress system 1, the inflatable air mattress 100 includes a support surface 101 for a patient 10 to lie on. When the air mattress system 1 is in use, the patient 10 lies on the support surface 101 of the inflatable air mattress 100.

The inflatable air mattress 100 is connected to an inflation source 20 so as to supply the inflatable air mattress 100 with air. As shown in the drawings, the inflatable air mattress 100 can also be formed by multiple air cells 110 in a horizontal arrangement; however, the present invention is not limited to the example above, and the inflatable air mattress 100 can also be formed as a one-piece bed having at least one air chamber. To provide the level of support in response to caretaking needs for a patient (for example, pressure ulcer prevention or treatment and respiratory support) or habits and preferences, the inflatable air mattress 100 can be provided with a function of adjustable firmness by controlling the amount of air in the air cells 110. Moreover, by continuous inflation or deflation control on the air cells 110 at different positions, the inflatable air mattress 100 can be provided with a function of alternating pressure reduction. In the inflatable air mattress 100, the support surface 101 is a top surface for carrying a patient. The top surface can also be a top surface of the air cells 110, or can be a top surface of a bedspread or a bottom sheet covering the air cells. Moreover, on the basis of different inflation levels inside the inflatable air mattress 100 or the function of alternating pressure reduction performed by the inflatable air mattress 100, the support surface 101 can be a flat surface or a non-flat surface with slight undulation. When the function of alternating pressure reduction is performed by the inflatable air mattress 100, the support surface 101 can be an external surface of the bedspread or the bottom sheet that is formed and supported by the air cells located at higher positions because of being in an inflated state.

The air pipeline 200 is in fluid communication with the inflatable air mattress 100 and the inflation source 20, and air from the inflation source 20 enters the inflatable air mattress 100 via the air pipeline 200 under the control of the control host. Some regions of the air pipeline 200 can be joined together by high-frequency welding between two layers of thermoplastic polyurethane (TPU) fabrics, and regions not joined together can form pipelines, channels or air chambers. The air pipeline 200 in a non-inflated state in the drawings are given as an example.

The CPR valve device 300 is in fluid communication with the air pipeline 200, and is operable to provide a path for releasing air from the inflatable air mattress 100, so as to achieve the effect of quickly releasing air inside the inflatable air mattress 100. The air pipeline 200 can be disposed between the CPR valve device 300 and the inflation source 20. The CPR valve device 300 can quickly change the level of firmness of the mattress during first-aid treatment, enabling a patient to promptly enter environmental conditions (that is, a patient needs to lie flat on a solid flat surface) suitable for the implementation of CPR, so as to ensure effectiveness of CPR and safety of the patient.

Figure 3:
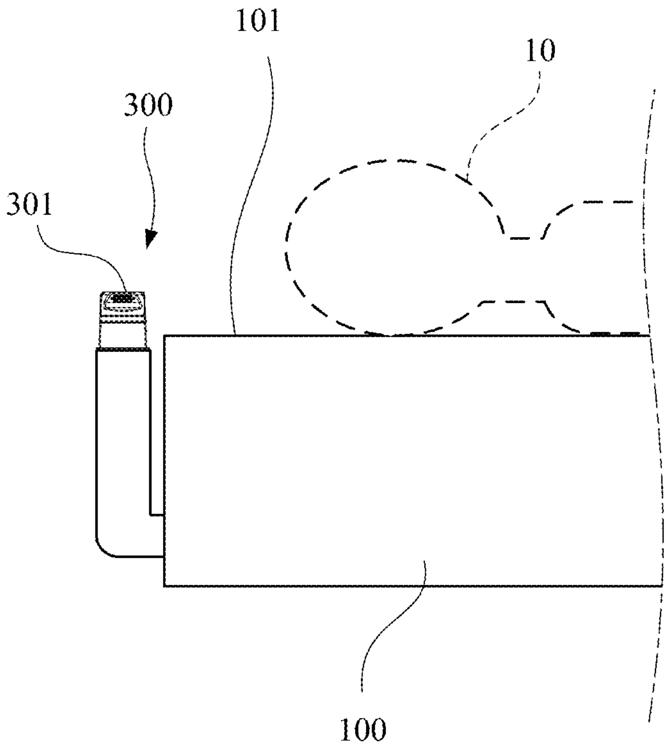
FIG. 3 is a partial side schematic diagram of an air mattress system according to some embodiments of the present invention.

Refer to FIG. 3 showing a partial side schematic diagram of an air mattress system according to some embodiments of the present invention.

The CPR valve device 300 includes a top 301. The CPR valve device 300 is configured such that, in a state of use when a patient lies on the inflatable air mattress 100, the top 301 of the CPR valve device 300 is not lower than the support surface 101 near the CPR valve device 300; that is, the CPR valve device 300 is substantially leveled with or higher than the support surface 101 of the inflatable air mattress 100 nearby.

In normal conditions of use, the inflatable air mattress 100 includes achieving a level of bed firmness corresponding to needs of a patient and an inflation level meeting caretaking requirements or patient preferences, but excludes conditions such as incomplete inflation, incorrect operation, incorrect installation or damaged air cells. Regarding the position of a bottom surface of the inflatable air mattress 100 placed flat as a reference plane, when comparing a firmer bed (with a higher inflation level) and a softer bed (with a lower inflation level), the height of the support surface 101 of the inflatable air mattress 100 having a firmer bed (with a higher inflation level) is expected to be greater than the height of support surface 101 of the inflatable air mattress 100 having a softer bed (with a lower inflation level). Moreover, once patients of different weights lie on the inflatable air mattress 100, the height of the support surface 101 of the inflatable air mattress 100 is also affected.

Accordingly, with the inflation level of the inflatable air mattress 100 functioning well and the support surface 101 having a patient lie on, the CPR valve device 300 is configured to have its top 301 be substantially leveled with or be higher than the support surface 101 nearby, and extend laterally from the side of the inflatable air mattress 100. For example, when the CPR valve device 300 is disposed on a top side of the inflatable air mattress 100, the top 301 of the CPR valve device 300 is substantially leveled with or higher than the support surface 101 near a head area of the inflatable air mattress 100. In another preferred embodiment, with the inflation level of the inflatable air mattress 100 functioning well and the support surface 101 having a patient lying thereon, the CPR valve device 300 is configured to have its top 301 be substantially higher than the support surface 101 nearby and extend laterally from the side of the inflatable air mattress 100, a height range by which the CPR valve device 300 is higher than the support surface 101 nearby can be between 0.5 cm and 5 cm, between 1 cm and 4.5 cm in another preferred embodiment, between 1.5 cm and 4 cm in another preferred embodiment, between 2 cm and 3.5 cm in another preferred embodiment, and between 2.5 cm and 3 cm in yet another preferred embodiment. Thus, in the event of an emergency, even if an individual performing CPR and the CPR valve device 300 or a caregiver and the CPR valve device 300 is not located on the same side of the inflatable air mattress 100, the individual performing CPR or the caregiver can still quickly locate the CPR valve device 300 with the good visibility of the CPR valve device 300 in the configuration above, thereby further reducing the precedent time needed for a patient to receive CPR rescue and seizing the prime time for such rescue.

Figure 4:
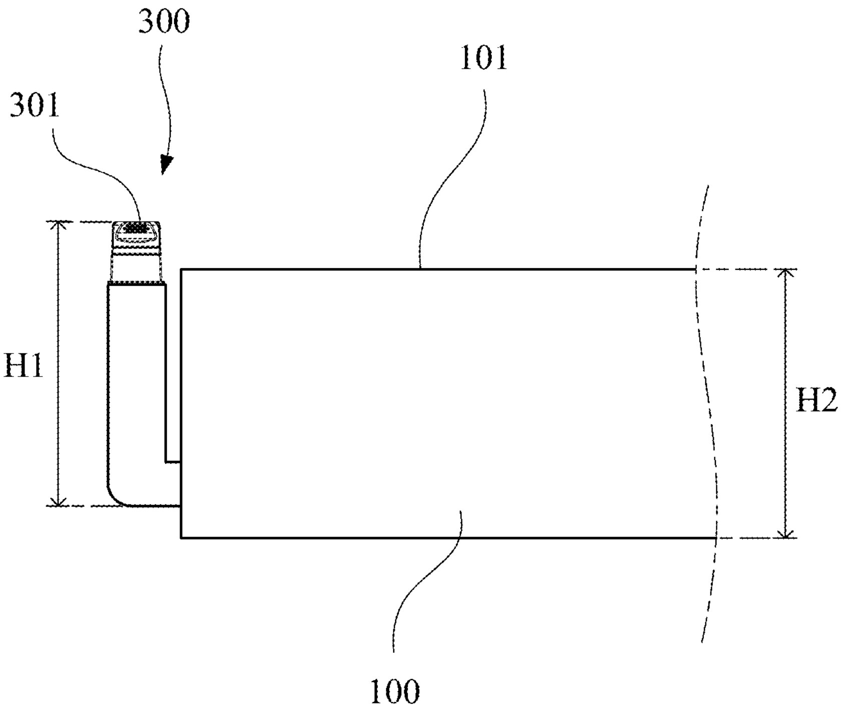
FIG. 4 is a partial side schematic diagram of an air mattress system according to some embodiments of the present invention.

Refer to FIG. 4 showing s a partial side schematic diagram of an air mattress system according to some embodiments of the present invention.

In another implementation form, the CPR valve device 300 is configured such that, when the inflatable air mattress 100 is in an inflated state and ready for use, a position of a junction between the CPR valve device 300 and the air pipeline 200 is lower than a position at a half of the height of the inflatable air mattress 100, and a height H1 of a position at which the CPR valve device 300 is disposed is greater than a half of a height H2 of the inflatable air mattress 100, and the CPR valve device 300 is configured to have its top 301 substantially higher than or level with the adjacent support surface 101.

The air pipeline 200 can be usually arranged at least along a long side of the inflatable air mattress 100 and be in fluid communication with each airbag 110 (FIG. 1), so as to provide an air transport path between the inflation source 20 and the inflatable air mattress 100.

The CPR valve device 300 is in fluid communication with the air pipeline 200. When the CPR valve device 300 is operated and opened, air in the inflatable air mattress 100 passes through the air pipeline 200, reaches the CPR valve device 300 and is released, so as to quickly deflate the inflatable air mattress 100.

Since the position of the junction between the CPR valve device 300 and the air pipeline 200 is lower than the position at a half of the height of the inflatable air mattress 100, the position of the junction between the CPR valve device 300 and the air pipeline 200 is closer to a bottom of the inflatable air mattress 100, so that the overall center of gravity of the CPR valve device 300 is lower to improve structural stability. Moreover, since the height H1 of the CPR valve device 300 is greater than a half of the height H2 of the inflatable air mattress 100, the top 301 of the CPR valve device 300 can be leveled with or higher than the top surface of the inflatable air mattress 100.

According to an embodiment, the CPR valve device 300 is disposed on a top side of the inflatable air mattress 100, wherein the top side is near the head of the patient 10 and is one of two short sides of the inflatable air mattress 100.

In response to forms of air cells at different positions and the corresponding inflation and deflation functions and effects, and to correspond to a lift function for shoulders/back/legs of the bed frame, the inflatable air mattress 100 is directional in terms of having a head and a tail. As an example, the CPR valve device 300 can be disposed on the top side of the inflatable air mattress 100 near the head of the lying patient 10 (that is, a position of the bed head), so as to avoid the side rails (not shown) of the bed frame arranged on two long sides of the inflatable air mattress 100.

Accordingly, the benefit of disposing the CPR valve device 300 on the top side instead of on the long side (the left and right sides) of the inflatable air mattress 100 is that, during the normal operation of a lift function of the bed frame, the CPR valve device 300 is prevented from colliding with the side rails as it does not protrude from the side surface of the inflatable air mattress 100. Thus, in addition to providing a smoother operation for the lift function of the bed frame, the CPR valve device 300 is also prevented from frequent collisions and damage caused by the collisions. In addition, it also stays unlikely for children or non-professionals to come into contact with the CPR valve device 300, further preventing unintentional operations. Moreover, nursing staff or a caregiver usually stands near one side of the long sides of the inflatable air mattress 100 when taking care of a patient, and thus interference on movement routes and risks of tripping can be eliminated by disposing the CPR valve device 300 on the top side of the inflatable air mattress 100.

Furthermore, by disposing the CPR valve device 300 on the top side of the inflatable air mattress 100 and near the head of a patient and further arranging the top 301 of the CPR valve device 300 to protrude from the support surface 101, the visibility of the CPR valve device 300 can be increased, so that an individual performing CPR can more quickly locate the position of the CPR valve device 300 and operate the CPR valve device 300 more smoothly. In addition, a gap between a pipeline by which the CPR valve device 300 extends out from the top 301 and the inflatable air mattress 100 can also be used to receive a mid-size bed sheet or a large-side bed sheet that is commonly used in hospitals to cover the inflatable air mattress 100. In addition to preventing the bed sheet from blocking the CPR valve device 300, the configuration of the present invention further enables the bed sheet to maintain its original function of keeping basic dirt off.

Figure 5:
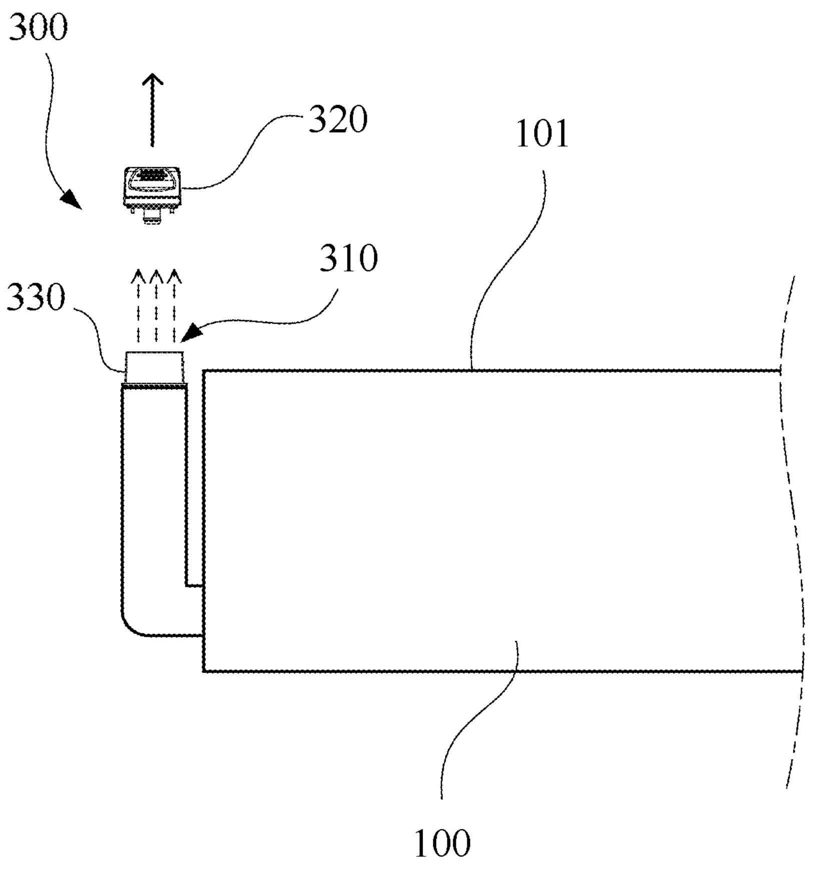
FIG. 5 is another partial side schematic diagram of an air mattress system according to some embodiments of the present invention.

Refer to FIG. 5 showing another partial side schematic diagram of an air mattress system according to some embodiments of the present invention.

The CPR valve device 300 includes an air release port 310, and an air exit direction of the air release port 310 is substantially perpendicular to the support surface 101 of the inflatable air mattress 100, such that air is directed to be ejected upward instead of toward a patient and is thus prevented from affecting the patient and the individual performing CPR. Moreover, with the arrangement of disposing the CPR valve device 300 on the top side of the inflatable air mattress 100 and the air exit direction of the air release port 310 facing upward, the pipeline inside the CPR valve device 300 is configured to be linearly upward, so as to reduce the issues of degraded air transportation efficiency and noise caused by a winding design of the pipeline. Moreover, since the air exit direction of the air release port 310 is substantially perpendicular to the support surface 101 of the inflatable air mattress 100, and an external label of the CPR valve device 300 allows the individual to clearly locate the position for air release, it can be determined by checking the amount of released air whether the CPR valve device 300 is correctly activated, without having to lift up the bed sheet, squat down to search the sides of the air mattress or move to the inflation source 20 to check the pipelines, hence saving the precedent procedure and time for implementation of CPR. It should be noted that, the advantages of the design above are also applicable for medical staff for routine check, maintenance and cleaning processes of the CPR valve device 300, so as to eliminate excessive steps and save unnecessary strength consumption.

Figure 6:
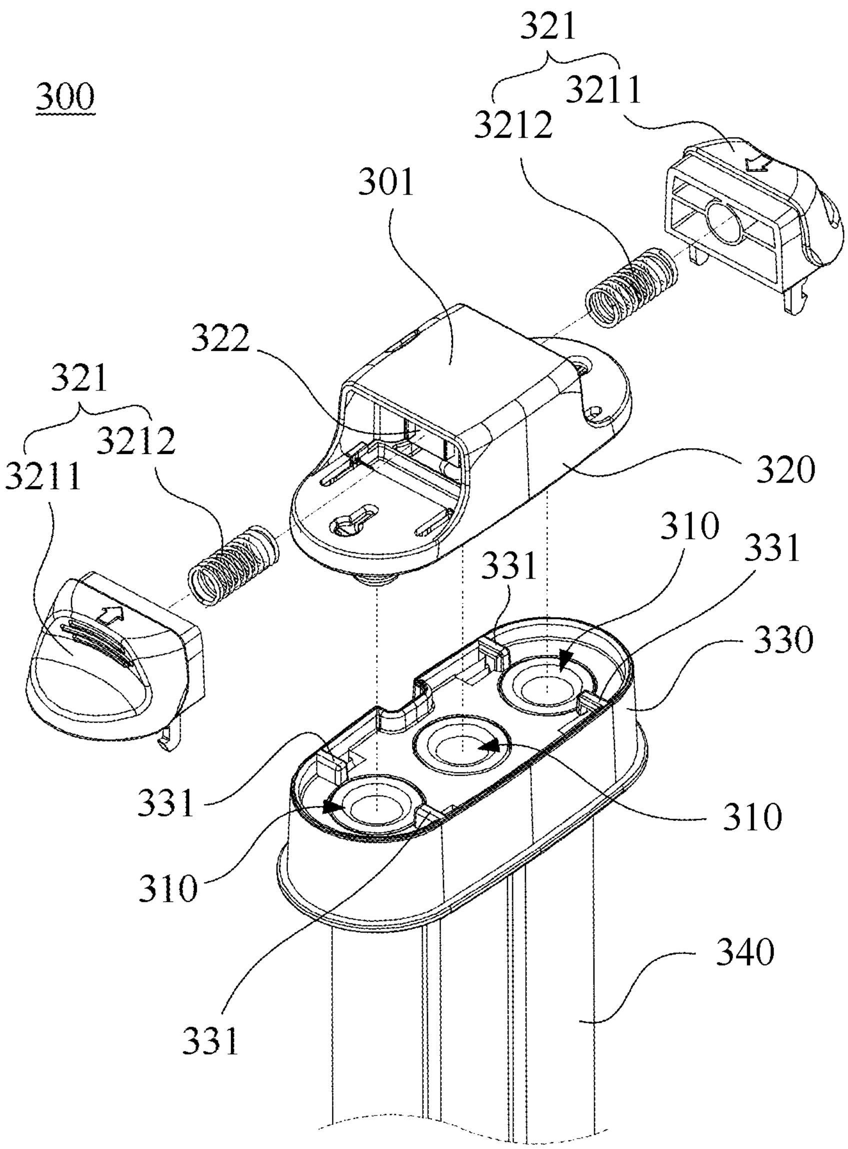
FIG. 6 is an exploded schematic diagram of a CPR valve device in an air mattress system according to some embodiments of the present invention.

Referring to FIG. 5 and FIG. 6, FIG. 6 shows an exploded schematic diagram of a CPR valve device in an air mattress system according to some embodiments of the present invention.

The CRP valve device 300 includes a cover lid 320 and a base 330. The cover lid 320 is disposed on the base 330 in an outwardly detachable manner, and the base 330 is operable to fix one end of a pipeline 340 to form the air release port 310. When the cover lid 320 is mounted on the base 330, the cover lid 320 seals the air release port 310. When the air exit direction of the air release port 310 is arranged to face upward (perpendicular to the support surface 101), the cover lid 320 is removed upward in order to open the CPR valve device 300. Accordingly, the individual performing CPR is allowed to intuitively and quickly perform operations so as to activate the CPR valve device 300 without being restricted to operating habits of the dominant hand.

Figure 7:
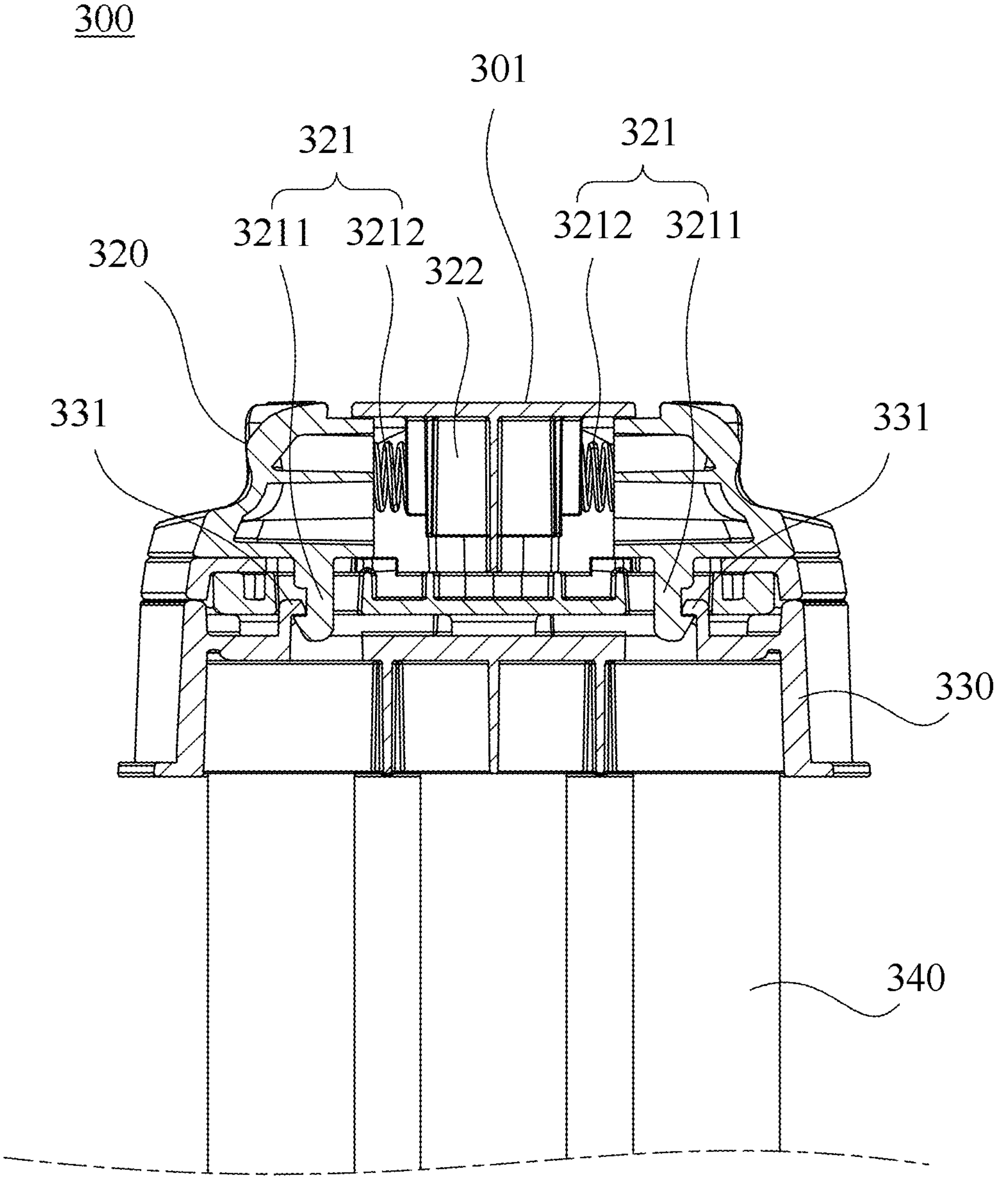
FIG. 7 is a cross-sectional schematic diagram of a CPR valve device in an air mattress system according to some embodiments of the present invention.

Refer FIG. 7 showing a cross-sectional schematic diagram of a CPR valve device in an air mattress system according to some embodiments of the present invention.

The cover lid 320 of the CPR valve device 300 includes a release structure 321. The release structure 321 releases limiting and fixing between the cover lid 320 and the base 330 once pressed, so as to prevent the CPR valve device 300 from being removed too easily and hence from being opened unintentionally. The release structure 321 includes a press member 3211 and a reset spring 3212. The press member 3211 is engaged with a limiting portion 331 of the base 330, so as to limit and fix the cover lid 320 on the base 330 when the press member 3211 is not applied with a force or pressed by the release structure 321. A fixing structure 322 of the cover lid 320 is an immobile element relative to the release structure 321, and the reset spring 3212 is disposed between the press member 3211 and the fixing structure 322, so that the press member 3211 is kept at an original position at which it is engaged with the base 330 when no force is received, and departs from the original position when a force is received.

To open the CPR valve device 300, the individual performing CPR can apply a force to press the press member 3211 for the press member 3211 to move and be set free from the engaging of the limiting portion 331 of the base 330, the limiting and fixing between the cover lid 320 and the base 330 are then released, and then a force is applied to remove the cover lid 320 in a direction away from the base 330, accordingly opening the CPR valve device 300.

Figure 8:
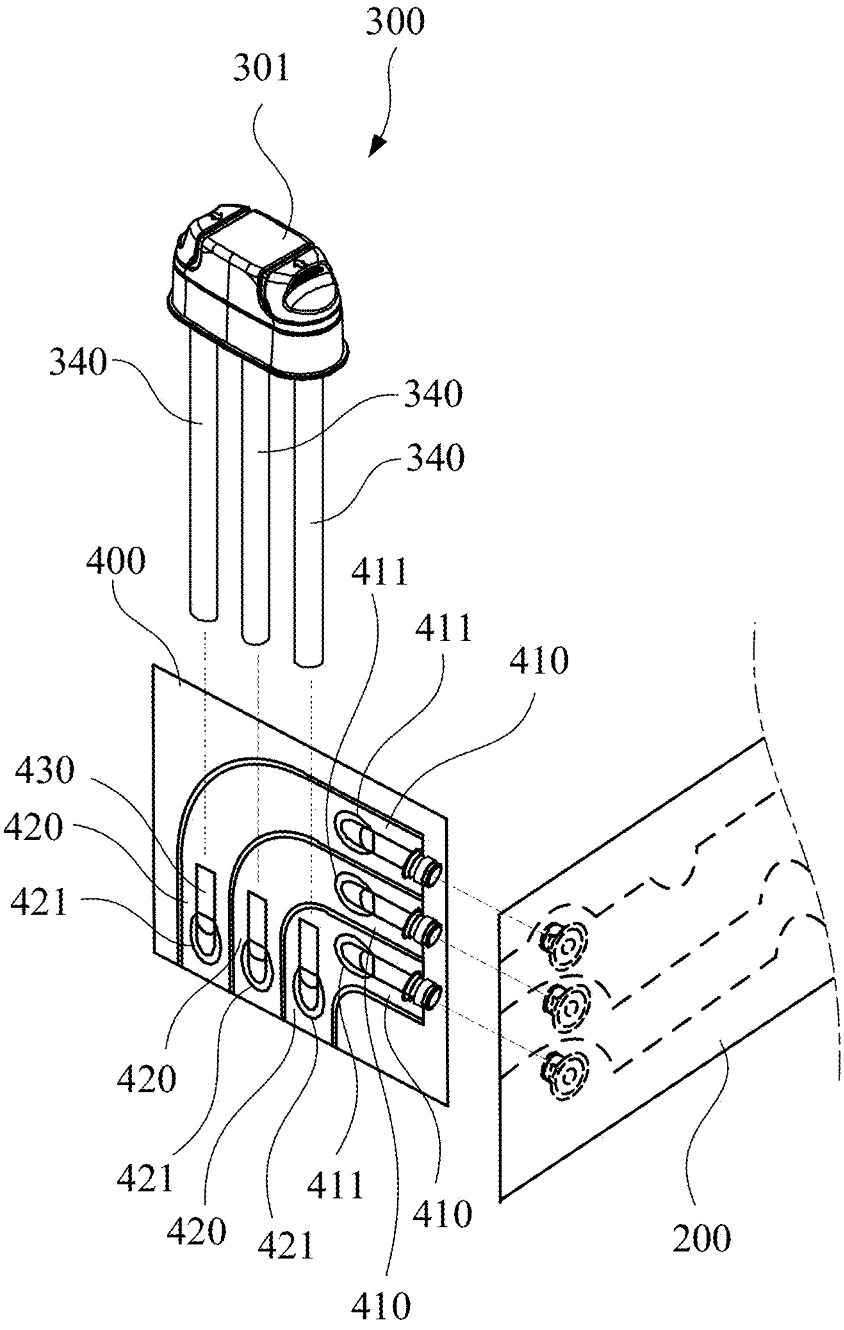
FIG. 8 is a partial schematic diagram of an air mattress system according to some embodiments of the present invention.
Figure 9:
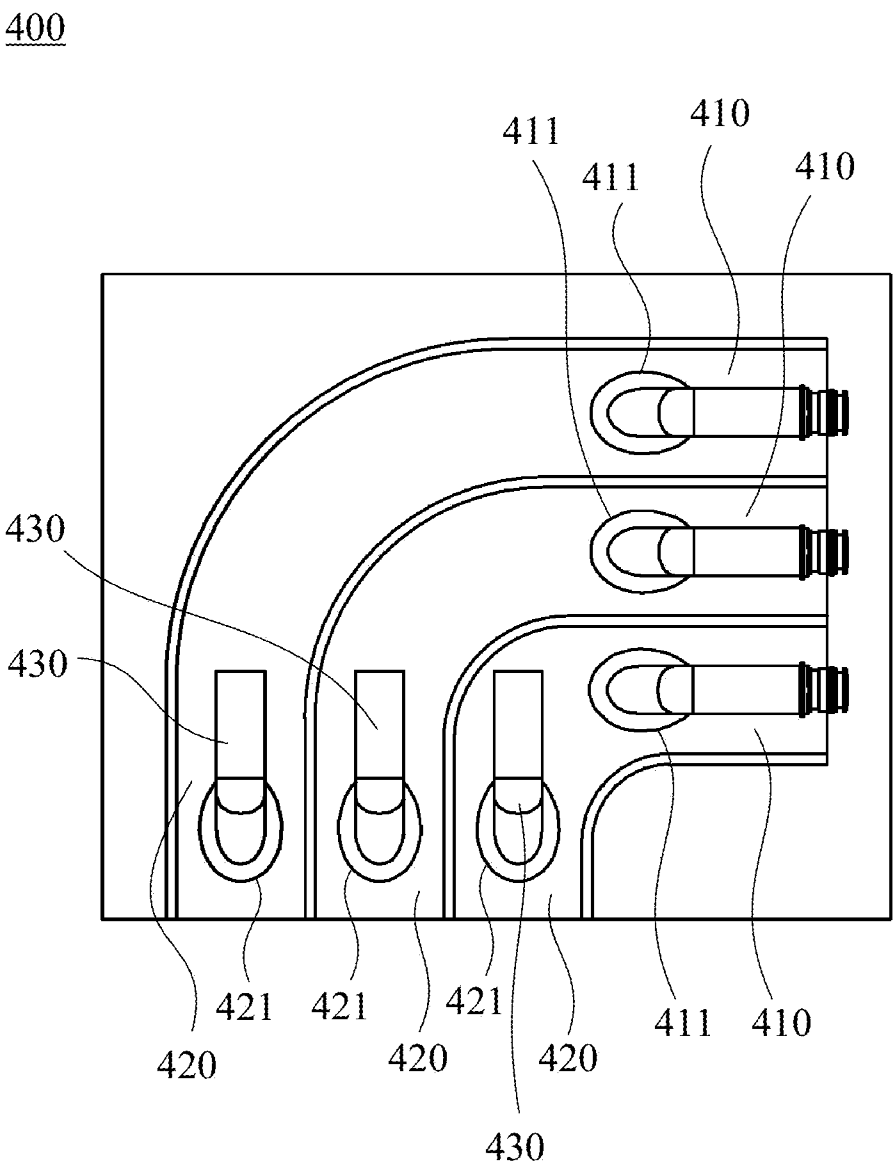
FIG. 9 is a side schematic diagram of an adapter in air mattress system according to some embodiments of the present invention.

Referring to FIG. 1, FIG. 8 and FIG. 9, FIG. 8 shows a partial schematic diagram of an air mattress system according to some embodiments, and FIG. 9 shows a side schematic diagram of an adapter in an air mattress system according to some embodiments.

The air mattress system 1 can further include an adapter 400. The adapter 400 is connected between the air pipeline 200 and the CPR valve device 300, and is operable to change a direction of air flowing in the air pipeline 200 from a direction parallel to the support surface 101 to a direction perpendicular to the support surface 101, so as to provide an air flow path from the air pipeline 200 to the CPR valve device 300. Under the normal arrangement of the air pipeline 200 disposed along the long side of the inflatable air mattress 100, by changing the direction of air flowing in the air pipeline 200 from a horizontal direction to a vertical direction by the adapter 400, and with the connection to the CPR valve device 300, the CPR valve device 300 can be arranged on the top side of the inflatable air mattress 100 and near the head of the patient. The adapter 400 guides and extends the air flow path from the long side of the inflatable air mattress 100 to the short side of the inflatable air mattress 100.

Some regions of the adapter 400 can be joined together by high-frequency welding between two layers of thermoplastic polyurethane (TPU) fabrics, and regions not joined together can form pipelines, channels or air chambers. In the drawings, the adapter 400 is depicted in a state in which no air is introduced.

The adapter 400 includes a first air channel 410 and a second air channel 420 in fluid communication with each other, and three first air channels 410 and three second air channels 420 are depicted as an example in the drawings. A direction of air flowing in the first air channel 410 is substantially perpendicular to a direction of air flowing in the second air channel 420, an air inlet end 411 of the first air channel 410 is connected to the air pipeline 200, a junction of the second air channel 420 from the first air channel 410 extends along a direction substantially perpendicular to the support surface 101 of the inflatable air mattress 100 and is away from the support surface 101.

Three pipelines 340 are also depicted as an example in the CPR valve device 300 in the drawings, and the three pipelines 340 and the three second air channels 420 are connected by one-to-one correspondence. As shown in the drawings, an air outlet end 421 of the second air channel 420 is connected to the CPR valve device 300, and the three second air channels 420 extending downward extend individually by different distances, so that positions at which the respective air outlet ends 421 connected to the three pipelines 340 of the CPR valve device 300 can be located on a same horizontal plane. Thus, the three pipelines 340 of the CPR valve device 300 can be made to have the same length, and this is advantageous to reducing manufacturing complications and improving assembly accuracy and convenience of assembly of parts. With the structural combination of the air pipelines 200 (together with the design of air cells) and the adapter 400, the air mattress system 1 of the present invention can achieve the effect of changing the direction of channels for fluid deflation during CPR within a minimal space. Compared with the prior art which PVC tubes are bent for direction turning and specifications of different lengths are required, the embodiments of the present invention are more beneficial for overall storage, and reduce an overall volume occupied by the bed as well as offering optimal storage and maximized space utilization of the bed.

As shown in the drawings, the horizontal first air channel 410 and the vertical second air channel 420 are connected by an arc pipe in between, so as to reduce the issue of noise generated by flowing air colliding with vertical tube walls.

Figure 10:
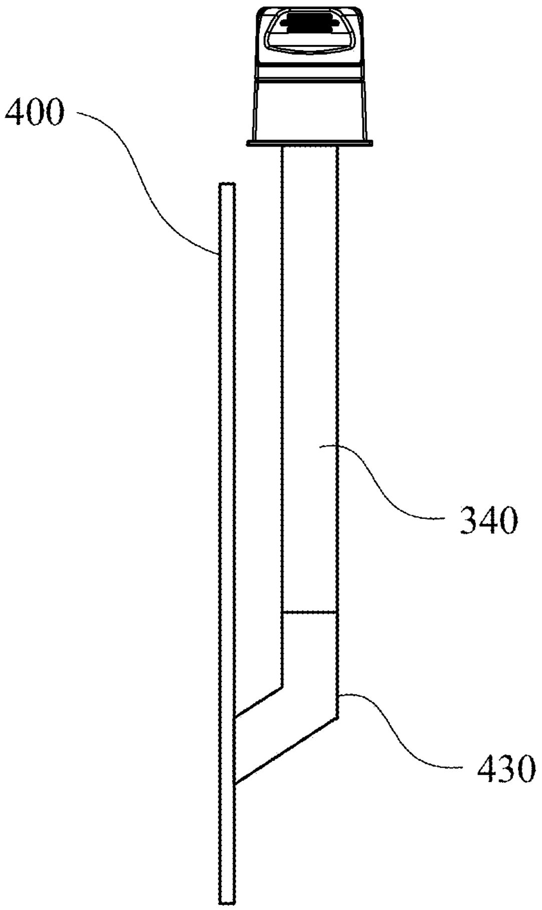
FIG. 10 is a schematic diagram of a CPR valve device and an adapter in an air mattress system according to some embodiments of the present invention.

Referring to FIG. 8 to FIG. 10, FIG. 10 shows a schematic diagram of a CPR valve device and an adapter in an air mattress system according to some embodiments.

The adapter 400 further includes a redirecting portion 430. The redirecting portion 430 has one end disposed at the air outlet end 421 on a side surface of the adapter 400 to connect the second air channel 420, and the other end connected to the pipeline 340. The redirecting portion 430 is operable to redirect air flowing out from the air outlet end 421 of the adapter 400 to flow in a direction substantially perpendicular to the support surface 101 of the inflatable air mattress 100 and to further flow to the air release port 310 via the pipeline 340. As an example, the redirecting portion 430 is a tube in a number corresponding to the number of the second air channels 420 and the pipelines 340. Moreover, the redirecting portion 430 extends upward in an inclined manner, and extends at an angle of inclination preferably greater than 90 degrees, so as to prevent noise possibly generated by flowing air colliding with tube walls. The pipeline 340 can be a linear flow channel structure, and the air release port 310 at an end thereof is vertically upward.

Figure 11:
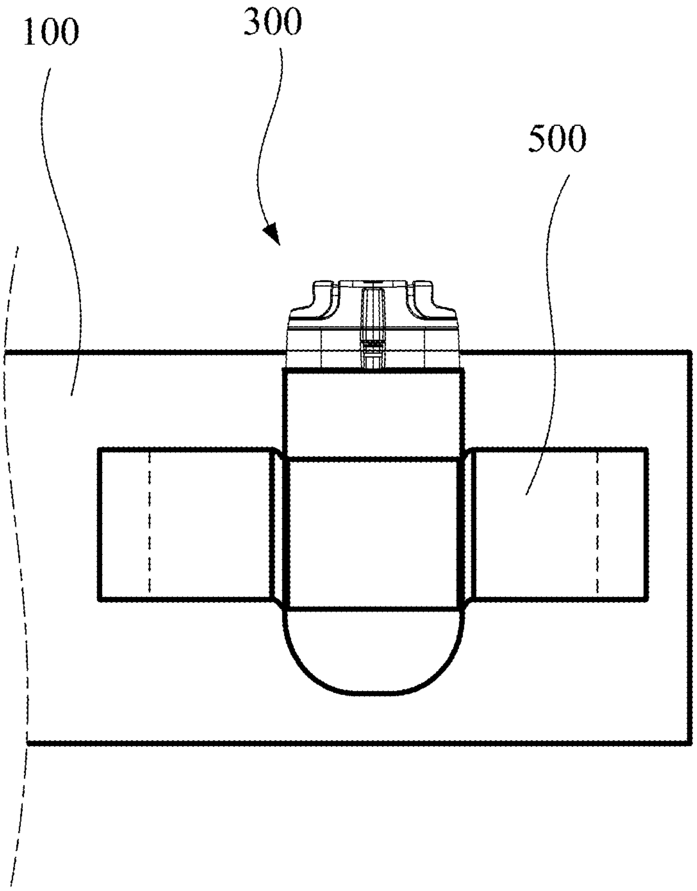
FIG. 11 is another partial schematic diagram of an air mattress system according to some embodiments of the present invention.

Refer to FIG. 11 showing another partial schematic diagram of an air mattress system according to some embodiments.

The air mattress system 1 can further include a support member 500. The support member 500 supports and limits the CPR valve device 300 on one side of the inflatable air mattress 100. A portion of the support member 500 is detachably disposed on a side surface of the inflatable air mattress 100, and the CPR valve device 300 can lean or abut against the support member 500, be accommodated in a space formed between the support member 500 and the side surface of the inflatable air mattress 100, or be sandwiched between the support member 500 and the side surface of the inflatable air mattress 100.

The support member 500 is an elastic or non-elastic strap or a sheet, and both of left and right ends of the strap or sheet can be detachably or non-detachably joined on the inflatable air mattress 100, such that a space for accommodating or sandwiching the CPR valve device 300 is formed between a middle region of the strap or the sheet and the side surface of the inflatable air mattress 100. Thus, the CPR valve device 300 can be supported and limited on one side of the inflatable air mattress 100, so as to maintain the upward form of the air release port 310 of the CPR valve device 300.

In another implementation form, the CPR valve device 300 can be accommodated in a fabric sleeve extending from a bottom sheet itself so as to prevent contamination. The support member 500 can be arranged on the fabric sleeve, for example, pull straps extending on both of left and right sides of the fabric sleeve, and be joined to the side surface of the inflatable air mattress 100 by the pull straps to fix the position of the CPR valve device 300. In yet another implementation form, the support member 500 can also be a set of snap fasteners having male and female fasteners respectively fixed to the corresponding side surface and fabric sleeve of the inflatable air mattress 100, so as to detachably fix and support the CPR valve device 300.

In conclusion, in the air mattress system according to some embodiments above, the CPR valve device 300 is configured to have its top 301 be leveled with or higher than the position of the support surface 101 nearby, allowing an individual performing CPR or caregiver, regardless of a current location, to quickly locate and operate the CPR valve device 300, hence reducing the time needed for a precedent procedure of deflating an inflatable air mattress, allowing a patient to more promptly receive first aid and improving the CPR success rate. In summary, the CPR valve device 300 enhances a CPR response speed, ensures first aid effectiveness and convenience of operation, and is conducive to improving quality and effects of emergency medical care.

The present disclosure is illustrated by various aspects and embodiments. However, persons skilled in the art understand that the various aspects and embodiments are illustrative rather than restrictive of the scope of the present disclosure. After perusing this specification, persons skilled in the art may come up with other aspects and embodiments without departing from the scope of the present disclosure. All equivalent variations and replacements of the aspects and the embodiments must fall within the scope of the present disclosure. Therefore, the scope of the protection of rights of the present disclosure shall be defined by the appended claims.

What is claimed is:

1. An air mattress system, comprising:

an inflatable air mattress, including a support surface for a patient to lie on, and connected to an inflation source;

at least one air pipeline, in fluid communication with the inflatable air mattress and the inflation source; and a cardiopulmonary resuscitation (CPR) valve device, in fluid communication with the at least one air pipeline, and operable to provide a path for releasing air from the inflatable air mattress;

wherein the at least one air pipeline is arranged at least along a long side of the inflatable air mattress, the at least one air pipeline is disposed between the CPR valve device and the inflation source, wherein the CPR valve device has a top, and is configured to have the top that is not lower than the support surface near the CPR valve device in a state of use when the patient lies on the inflatable air mattress, wherein the CPR valve device is disposed adjacent to a head-end short side of the inflatable air mattress.

2. The air mattress system according to claim 1, wherein the CPR valve device comprises an air release port, and an air exit direction of the air release port is substantially perpendicular to the support surface of the inflatable air mattress.

3. The air mattress system according to claim 1, further comprising:

an adapter, connected between the at least one air pipeline and the CPR valve device, and operable to change a direction of air flowing in the at least one air pipeline from a direction parallel to the support surface to a direction perpendicular to the support surface.

4. The air mattress system according to claim 3, wherein the adapter comprises a first air channel and a second air channel in fluid communication with each other, a direction of air flowing in the first air channel is substantially perpendicular to a direction of air flowing in the second air channel, an air inlet end of the first air channel is connected to the at least one air pipeline, the second air channel extends from a junction with the first air channel along a direction substantially perpendicular to the support surface of the inflatable air mattress and is away from the support surface, and an air outlet end of the second air channel is connected to the CPR valve device.

5. The air mattress system according to claim 3, further comprising:

a support member, configured to support and position the CPR valve device on one side of the inflatable air mattress.

6. The air mattress system according to claim 1, wherein the top of the CPR valve device is not lower than the support surface near the CPR valve device by a height range of between 0.5 cm and 5 cm.

* * * * *